United States Patent [19]

Dunham

[11] Patent Number: 5,711,243
[45] Date of Patent: Jan. 27, 1998

[54] CHAFE PROTECTION DEVICE

[76] Inventor: Billy Dunham, 12450 NE. 130th Ct. #F302, Kirkland, Wash. 98034

[21] Appl. No.: 611,343

[22] Filed: Mar. 6, 1996

[51] Int. Cl.⁶ .................................................. B63B 2/00
[52] U.S. Cl. ........................ 114/230; 114/221 R; 24/115
[58] Field of Search ........................ 114/218, 230, 114/221 R; 24/115 R, 115 K, 136 K; 242/397, 566; 254/389

[56] References Cited

U.S. PATENT DOCUMENTS

| | | |
|---|---|---|
| 3,550,910 | 12/1970 | Kowack ................................ 24/115 R |
| 3,702,709 | 11/1972 | Shaffer ................................ 24/115 K |

Primary Examiner—Jesus D. Sotelo
Attorney, Agent, or Firm—Paul L. Griffiths

[57] ABSTRACT

A chafe protector in the general shape of a thimble used with eye splices in rope. The chafe protector having flexible portions such that an open end of the thimble can be forced over a ring or cleat for securing a vessel thereto. The thimble having tubular portions on each leg at the open end to hold a rope in place thereon; and another tubular portion at the opposite end for the same purpose. A removal loop is attached opposite the open end to aid in removing the thimble from the mooring ring or cleat. Once in place the thimble protects the rope and the rope is free to slid through the thimble for adjustment purposes.

9 Claims, 2 Drawing Sheets

CHAFE PROTECTION DEVICE

TECHNICAL FIELD

The present invention relates to chafe protection devices for marine use, and more particularly, to devices for protecting mooring lines from chafing against mooring rings or the like.

BACKGROUND ART

There are many situations where a rope passes over another surface and can chafe due to repeated movement over that surface. The movement is usually minimal but over time can cause the rope to weaken and need replacement, or worse, the rope could break. One situation in particular is when a boat is attached to a mooring buoy ring or a steel ring on a dock. One way to reduce the risk of chafe is to use some form of protector. It is well known to use a thimble on the inside of a spliced eye to protect the rope from a shackle or the like. Leather or rubber tubing is sometimes used to protect a rope from chafing, such as where the rope passes through a chock or hawser hole. Chafe is a problem with most types of rope or line, whether they are made form natural or man made material, or even steel and aramid fibers. The damage caused by chafe is both expensive and at times very dangerous.

There are many times when a boat is only temporarily tied to a mooring ring or dock ring, such as while on a summer cruise. Therefor the need for a reusable form of chafe protection is important. The chafe protection gear should also be easy to use with any piece of rope or line. In the case of a boat tying up to a ring, a line is usually passed through the ring and brought back up to the boat deck where each end is tied off, usually to a cleat. Depending on the size of a mooring buoy or the height of a dock, the length of line needed can vary and the position of chafe protection can vary significantly.

As wind and current change the position of a boat, the line going through a mooring ring can become slack. Therefor the chafe protector must be able to hold its position relative to the mooring ring and the line. The chafe protector must be easy to attach and remove from the mooring ring especially if it is out of a persons reach, which is usually the case with all but very small boats. It would be best if the chafe protector allowed the line to pass freely therethrough for ease in adjustment of the length of the free end of the line. The chafe protector described herein is designed to solve all of the above problems while remaining simple and easy to use.

SUMMARY OF THE INVENTION

A chafe protector for use in protecting mooring lines or the like from chafing against a mooring ring includes a thimble having an arcuate end and an open end connected together by a pair of legs, a means for retaining said thimble to said line, and includes a removal loop located away from the open end whereby a boat hook or the like can be used to engage the loop and pull the thimble off of the mooring ring by flexing the thimble just enough to increase the size of the opening in the open end. The thimble may include stiffener tabs located on an inside surface of the open end to help ensure that it stays on the mooring ring and provides a snap-on snap-off type of action. The thimble may also include rounded portions for retaining the thimble to a rope. The thimble is preferably made from a corrosion free material such as nylon or the like. The arcuate portion is flexible in that it flexes to allow the open end to be opened to a greater amount thereby allowing the open end to pass over a mooring ring and then snap shut. Said stiffener tabs aiding in assuring that the thimble stays in position around the ring.

The chafe protector is used by placing a rope to be protected around the thimble with a free end of the rope being run through the ring. Both ends of the rope are then pulled and the thimble flexes to allow the opening to slip over the ring and be retained therein. To remove the thimble from the ring, the removal loop is engaged and pulled thus reversing the process.

BRIEF DESCRIPTION OF THE DRAWINGS

In the drawings, like reference numerals and numbers refer to like parts throughout the various views, and wherein.

BEST MODE FOR CARRYING OUT THE INVENTION

Figure 1:
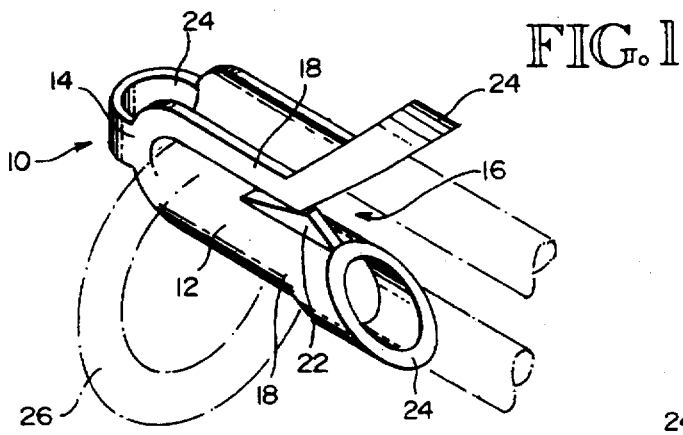
FIG. 1 is a pictorial view taken from one side and slightly above a chafe protector with a rope and a mooring ring shown in phantom.

Referring now to FIG. 1, a chafe protector is generally shown at 10. A thimble 12 forms the basic shape of the protector 10. The thimble 12 includes an arcuate portion 14, an open end 16 and a pair of legs 18. Open end 16 includes an opening 20 between legs 18. Opening 20 is defined by a pair of retainer tabs 22 located on inner surfaces of legs 18. A means for retaining thimble 12 to a rope (shown in phantom) includes at least one tubular portion 24 at the arcuate portion 14 or along the legs 18. Tubular portions 24 could also take the form of tabs such that a complete tub is not formed. This construction would enable a rope to be removed from leg 18 by pulling on it and a continued pull would remove protector 10 from a mooring ring.

Figure 2:
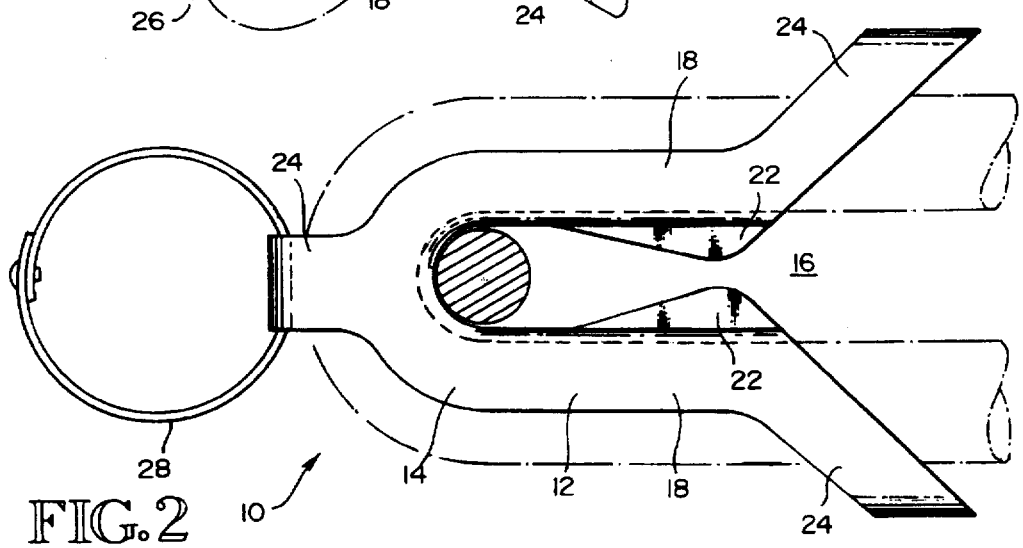
FIG. 2 is a side elevational view with a rope shown in phantom and a mooring ring shown in cross-section.
Figure 3:
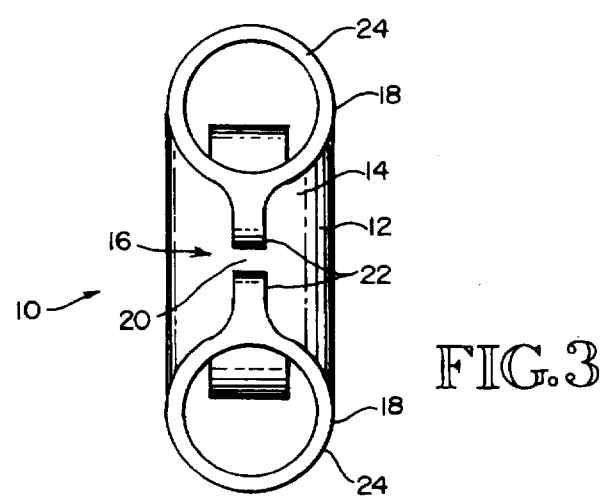
FIG. 3 is a bottom view showing rope retainers and securing tabs.
Figure 4:
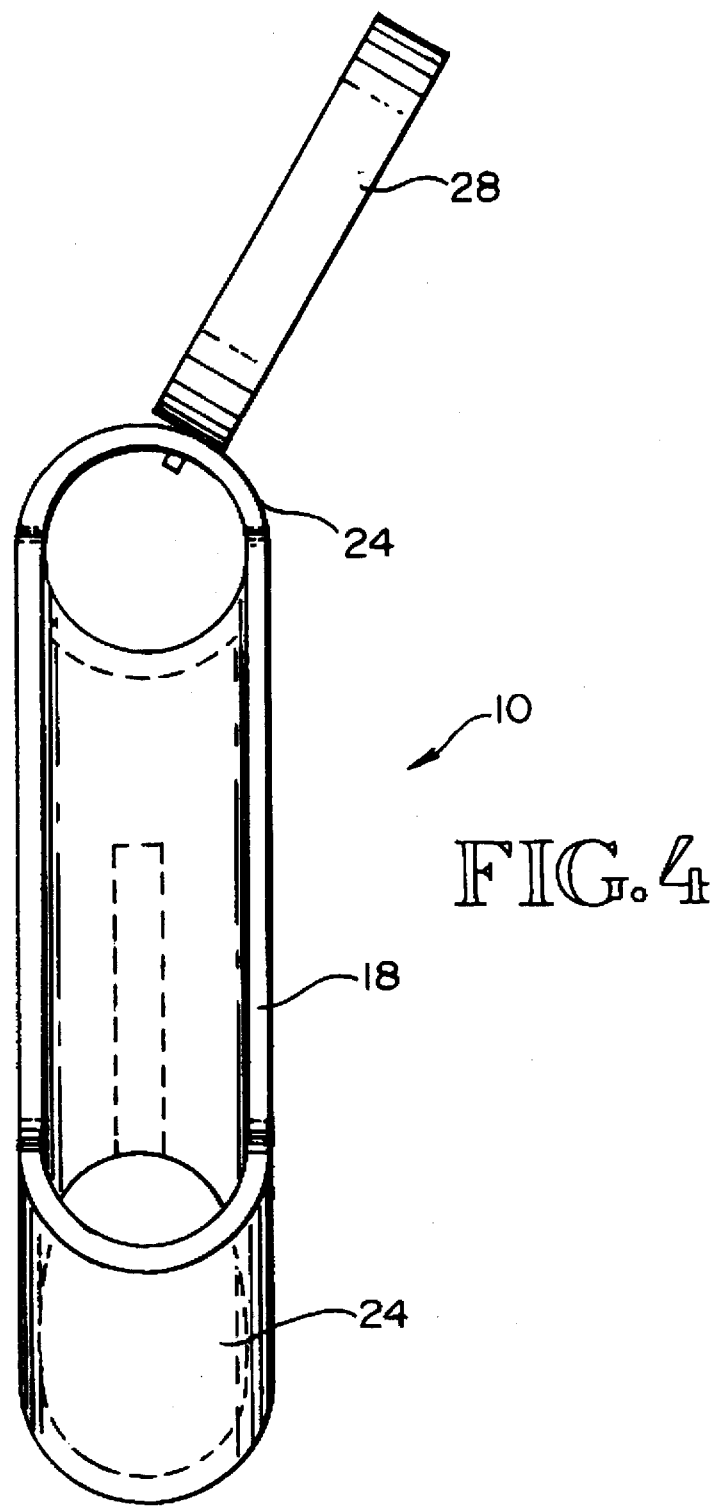
FIG. 4 is a side view showing an alterative embodiment for attaching a removal loop.

As shown in FIG. 2, tubular portions 24 form a vee for aiding in placement onto a mooring ring. A removal means 28 is provided to aid in removing the thimble 12 for mooring ring 26. Removal means 28 is a loop fastened to arcuate portion 14 and can be engaged by a boat hook or the like so that the protector 10 can be pulled off of mooring ring 26 from the deck of a boat.

As most pleasure boaters are familiar with, a permanent mooring usually has a steel or iron ring held up by a mooring buoy. One can tie up to the mooring by running a rope through the ring 26 and leading the free end back to a boat's deck and then cleat off both ends. Any boat where the bow is more than a foot or two above the water's surface makes it difficult to feed a rope through the ring 26. As a boat pulls on the mooring ring due to wind and current and wave action, the rope is prone to chafing which damages the rope and in certain conditions could cause the boat to break free from the mooring. The protector 10 described above is designed to prevent such chafing from occurring and to make its use possible from more than an arm's reach away from the mooring ring 26.

The present invention is injection molded out of nylon although any suitable material could be used, even stainless steel. The thickness of the thimble must be adjusted accordingly such that the legs 18 and arcuate portion 14 act in a spring-like fashion to allow tubular portions 24 to open sufficiently easy to allow opening 16 to pass over a mooring ring. Tabs 22 can also be adjusted in size to control the ease of placing the protector over a ring.

Having described the presently-known best mode for carrying out the invention, and various embodiments thereto, it is to be understood that the chafe protector described above and shown in the drawings could be altered in some ways without departing from what is considered to be the spirit and scope of the invention. For example, it is conceivable, and indeed, it may be likely, that the chafe protector disclosed here will be improved upon in future years. For this reason, any of the foregoing description should not be taken or interpreted in a limiting way, but instead should be used to give life and meaning to the subjoined patent claims which follow. It is the claims which define the metes and bounds of what is considered to be patented, the interpretation of which is to be made in accordance with the established doctrines of patent claim interpretation.

I claim:

1. A chafe prevention device for use in protecting rope from chafing comprising:

a thimble shaped base having an arcuate end and an open end, said thimble shaped base being sized and shaped to flex sufficiently to allow said open end to open wider, and a removal means attached to said arcuate end such that when said removal means is pulled on said base flexes allowing for removal of said thimble shaped base from a potential chafing object.

2. A device according to claim 1, wherein said removal means includes a loop attached to said arcuate end of said thimble shaped base.

3. A device according to claim 2, wherein said loop is made from a stiff material such that a boat hook can easily be placed through the loop for releasing the device from a mooring ring.

4. A chafe prevention device for use in protecting rope from chafing comprising:

a thimble, said thimble having a curved portion and an open end opposite thereto, said thimble also having a tubular section located along its curved portion, said tubular section acting to retain said rope therein, and said opening being capable of increasing in size for placing said thimble around a mooring ring due to flexing in said thimble.

5. A chafe protector for protecting rope comprising:

A thimble having an arcuate end, an open end, and a pair of legs connecting said arcuate end and said open end, said thimble being flexible such that an opening in said open end can be increased in size, and a means for removing said thimble from a mooring ring.

6. The chafe protector of claim 5, wherein said pair of legs include retaining tabs on their inner surfaces, said tabs helping to ensure that a mooring ring retained by the thimble remains so.

7. The chafe protector of claim 5, wherein said thimble includes a means for retaining it to said rope.

8. The chafe protector of claim 7, wherein said means for retaining it to a rope include a pair of tubular openings at the open end of the thimble.

9. The chafe protector of claim 8, wherein said tubular openings form a "V" shape with the point located at said opening in said open end of said thimble, said "V" shape aiding in placing said thimble onto said mooring ring.

* * * * *